(12) United States Patent
Pubanz et al.

(10) Patent No.: US 12,603,591 B2
(45) Date of Patent: Apr. 14, 2026

(54) METHOD FOR CONTROLLING AN ELECTRICAL GENERATOR OF A WIND TURBINE

(71) Applicant: Wobben Properties GmbH, Aurich (DE)

(72) Inventors: Andre Heinz Pubanz, Amersfoort (NL); Ewout Lagerweij, Apeldoorn (NL); Robert Rutteman, Amersfoort (NL)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 18/826,346

(22) Filed: Sep. 6, 2024

(65) Prior Publication Data

US 2025/0088129 A1     Mar. 13, 2025

(51) Int. Cl.
| | |
|---|---|
| *H02P 9/00* | (2006.01) |
| *F03D 9/25* | (2016.01) |
| *H02P 9/10* | (2006.01) |
| *H02P 101/15* | (2016.01) |
| *H02P 103/20* | (2016.01) |

(52) U.S. Cl.
CPC .............. *H02P 9/105* (2013.01); *F03D 9/25* (2016.05); *F05B 2220/706* (2013.01); *H02P 2101/15* (2015.01); *H02P 2103/20* (2015.01)

(58) Field of Classification Search
CPC .. H02P 9/105; H02P 2101/15; H02P 2103/20; H02P 29/50; F03D 9/25; F05B 2220/706
See application file for complete search history.

(56) References Cited

U.S. PATENT DOCUMENTS

| | | | | |
|---|---|---|---|---|
| 2005/0073280 A1* | 4/2005 | Yoshinaga | .............. | H02P 21/00 318/727 |
| 2010/0026008 A1* | 2/2010 | Sawahata | ............... | H02K 1/165 310/179 |
| 2012/0126628 A1* | 5/2012 | Bjerknes | ................. | F03D 15/10 363/157 |

FOREIGN PATENT DOCUMENTS

| | | |
|---|---|---|
| CN | 115276482 A | 11/2022 |
| CN | 115822885 A | 3/2023 |
| EP | 3 258 594 A1 | 12/2017 |
| EP | 4 064 552 A1 | 9/2022 |

(Continued)

OTHER PUBLICATIONS

European Search report; dated Feb. 9, 2024; Application # 23195851. 3.

*Primary Examiner* — Julio C. Gonzalez
(74) *Attorney, Agent, or Firm* — Polsinelli PC

(57) ABSTRACT

The present disclosure relates to a method for controlling an electrical generator of a wind turbine, the generator having a rotor and a stator, and the stator being controlled by a stator current. The stator current has a main component being characterized by a fundamental signal with a fundamental frequency and a fundamental phase angle, and a fractional harmonic current component being characterized by a fractional harmonic signal having a fractional harmonic frequency and a fractional harmonic phase angle. The method includes providing a compensation current having a compensation amplitude and a compensation phase angle, and determining the compensation phase angle depending on an absolute rotational position of the rotor.

12 Claims, 3 Drawing Sheets

(56)          References Cited

FOREIGN PATENT DOCUMENTS

WO          2014/030246  A1      2/2014
WO      WO-2024149497  A1  *    7/2024    ...........  F03D  7/0272

* cited by examiner

108

108        104        106

110

109

100

108

102

METHOD FOR CONTROLLING AN ELECTRICAL GENERATOR OF A WIND TURBINE

CROSS-REFERENCE TO RELATED APPLICATIONS

This application claims the benefit of priority to European application number 23195851.3, filed on Sep. 7, 2023, entitled "METHOD FOR CONTROLLING AN ELECTRICAL GENERATOR OF A WIND TURBINE", which is expressly incorporated by reference herein in its entirety.

TECHNICAL FIELD

The present disclosure is directed to a method for controlling an electrical generator of a wind turbine. The present disclosure is also directed to a wind turbine having an electrical generator which is controlled by a corresponding method.

BACKGROUND

Wind turbines are well-known, they produce electrical energy out of wind using an electrical generator. Such electrical generator may also generate noise. Part of such noise may be caused by the generated electrical alternating current and corresponding electromechanical effects which may result in low frequency noise and in particular tonality of the generator noise.

Tonality may correspond to the frequency of a fundamental wave of the electrical current generated by the generator, or to a higher harmonics of such base frequency.

Such low frequency noise, in particular tonality may be reduced by adapting the constructional design of the generator. For example the shape of pole shoes of the rotor may be adapted to lower such low frequency noise which in particular occurs with gearless wind turbines having large, slowly rotating ring generators.

However, such low frequency noise can often not completely be avoided by said structural design and thus further measures should be taken to reduce the low frequency noise.

SUMMARY

It was found that such low frequency noise may be caused by a frequency signal superimposed with the generated sinusoidal current generated by the generator. Such superimposed current leads to corresponding torque ripple, i.e. a superimposed torque signal having said higher harmonic frequency.

It was further found that such torque ripple could be counter steered with a counter torque ripple. Such counter torque ripple, i.e. a corresponding superimposed current signal, can be provided having an amplitude, frequency and phase angle defined with respect to the fundamental current waveform of the generated electrical current. The necessary amplitude, frequency and phase angle of such counter ripple torque or counter ripple current can be set depending on the torque ripple or corresponding current ripple measured in the generator. In particular measured or estimated during an operation of the generator when no countermeasure has been taken.

Based on such known current ripple or torque ripple a counter ripple current can be designed with respect to amplitude, frequency and phase angle of such counter ripple current. The phase angle of the counter ripple current can be defined with respect to the phase angle of the fundamental current signal of the generated current. In particular a zero crossing of the fundamental current signal can be taken as a reference, i.e. the zero crossing of the fundamental current signal can be taken as a reference angle of zero and the phase angle of the counter ripple current signal can be defined with respect to such reference angle of zero.

When generating such counter ripple current signal the phase angle of the fundamental current signal and its zero crossing can also be taken as a reference signal for generating the counter ripple current and in particular for setting the phase angle of the counter ripple current signal. When controlling the generator the generator current, i.e. the stator current is well-known and in particular information on this fundamental generator current signal, including its phase angle and thus including its zero crossing, is also well-known and any information on this is present in a corresponding controller. Thus, such information can be used to generate the counter ripple current and in particular the information can be used to set the necessary phase angle of the counter ripple current signal.

However, sometimes higher harmonic currents of the fundamental waveform of the generated electrical current of the generator may not or not only be responsible for such tonality. It was found that other current ripples or torque ripples may occur which are not synchronous with each fundamental waveform. Accordingly, such current ripple which are not synchronous with the fundamental waveform with the generator current cannot be counteracted in such a way as higher harmonics torque ripple can be compensated for.

Accordingly, it is one object of the present disclosure to address at least one of the mentioned issues. In particular a solution shall be suggested for coping with low frequency noise in particular tonality not or not only related to higher harmonics current ripple or higher harmonics torque ripple respectively. At least an alternative solution to so far known solutions shall be provided.

Accordingly, a method according to claim 1 is suggested. Such method is thus controlling an electrical generator of a wind turbine and the generator has a rotor and a stator. The stator is controlled by means of a stator current. Such control can be performed by means of an inverter connecting the output of the stator to a DC intermediate circuit. Such inverter can also be called a control rectifier or a generator facing inverter. Such inverter controls a three-phase stator current or a six-phase stator current, i.e. two three-phase stator currents. It could also be more than two three-phase stator currents which is however untypical. When controlling two three-phase stator currents it is possible to simply control each three-phase current on its own.

The stator current has a main component which is characterized by a fundamental signal with a fundamental frequency and a fundamental phase-angle, as is well-known.

In addition it was found that the stator current also has a fractional harmonic current component. Such fractional harmonic current component is characterized by a fractional harmonic signal having a fractional harmonic frequency and a fractional harmonic phase angle. It may also have a fractional harmonic amplitude.

Such fractional harmonic current component may thus have a fractional harmonic frequency similar but not identical to a higher harmonic frequency. For example the fractional harmonic frequency may for example be 2.2 times the fundamental frequency. Accordingly, its frequency is similar to a second high harmonic frequency, but not identical. Such fractional harmonic frequency is thus describing a sinusoidal signal having a zero crossing that is shifting slightly from one period of the fundamental frequency to the next period.

To explain with respect to the example of the fractional harmonic frequency being 2.2 times the fundamental frequency, the fractional harmonic signal may have a zero crossing at the same point in time as the fundamental signal in a first period of the fundamental signal. In the next period of the fundamental signal the zero crossing of the fractional harmonic signal is slightly shifted with respect to the zero crossing of the fundamental signal. To the next period it is further shifting and so on, until this repeats—for the example of 2.2 times the fundamental frequency—after five periods. Accordingly, and with respect to this simplified example, the fractional harmonic signal will have that zero crossing at the same point in time as the fundamental signal in the $6^{th}$ period of the fundamental signal again.

The method comprises the step of determining the fractional harmonic phase angle depending on an absolute rotational position of the rotor. As explained the fractional harmonic signal and thus its phase angle is not synchronous with each period of the fundamental signal. Accordingly, the fundamental signal—which is often well-known in the controller—cannot simply be used as a reference signal for providing the fractional harmonic phase angle. Accordingly, it is suggested to use an absolute rotational positon of the rotor.

It was found, that the fractional harmonic current component depends on the particular structure of the generator. It was found that in particular this phenomena occurs with a generator construction having single coils for each stator tooth and depends on the relationship between the number of stator teeth on the one hand and the number of rotor poles on the other hand. In particular in a permanent magnet synchronous generator having a rotor with a plurality of permanent magnet poles the relationship of number of pole pairs of the stator teeth may result in fractional harmonic current components. Accordingly, the particular fractional harmonic phase angle can clearly be related to the physical position of the rotor. It was found that the fractional harmonic phase angle has a fixed relationship with respect to the physical or mechanical position of the rotor of the synchronous generator. Accordingly, using the absolute rotational position of the rotor can be used as a reliable reference for determining the fractional harmonic phase angle.

Based on that it is suggested to control a compensation current for compensating the fractional harmonic current component depending on the fractional harmonic phase angle. Accordingly, the compensation current for compensating the fractional harmonic current component depends also on the absolute rotational position. Therefore, taking this absolute rotational position enables the control to provide said compensation current for compensating the fractional harmonic current component.

Based on the fractional harmonic phase angle a compensation current may be generated in order to compensate for the fractional harmonic current component. Accordingly, it is suggested to provide a compensation current having a compensation amplitude and a compensation phase angle and determining the compensation phase angle depending on an absolute rotational position of the rotor. Accordingly, such compensation current is provided depending on the absolute rotational position of the rotor.

This can be done by providing the compensation current depending on the fractional harmonic current component which is also depending on the absolute rotational position of the rotor. The compensation current is simply speaking similar to the fractional harmonic component, but having a different phase angle and possibly a different amplitude. Such compensation current can logically be calculated based on the fractional harmonic current component.

However, it is also possible to directly determine the compensation current without determining the fractional harmonic current component. I.e. it is according to one aspect suggested that the compensation current is provided with a compensation amplitude and a compensation phase angle depending on the absolute rotational position of the rotor without explicitly determining the fractional harmonic phase angle beforehand. One possibility is to define an initial phase shift between the compensation current and a reference value depending on the absolute rotational position of the rotor. Such reference value could be a zero crossing of the fundamental signal close to a marker indicating the absolute rotational position of the rotor. Such marker could as well just be virtual or could be defined with respect to a particular coil of the rotor. However, there could also be a physical marker which could be recognized by an optical sensor or a magnetic sensor.

The compensation phase angle can also be defined directly with respect to such marker of the rotor. Instead of the marker or as the marker, be it virtual or physically provided, a zero angle of the rotor can be defined. Accordingly, such zero angle of the rotor could be indicated by said marker or could just be defined with respect to a pole or pole shoe of the rotor. For example, the middle of one clearly defined pole, i.e. a permanent magnet of the rotor, can be the zero angle of the rotor.

The compensation phase angle can be defined with respect to such zero positon of the rotor plus an offset phase angle. To illustrate this as an example: When the rotor is at the zero rotor position, the compensation phase angle is not zero but deviates by said offset phase angle. So the zero position of the rotor plus the offset phase angle can be taken as the reference angle, i.e. zero angle, for the compensation current. With further rotating of the rotor the compensation phase angle will thus increase and that increase can be defined and measured with respect to the reference angle (zero angle) of the compensation current. However, the increase of the compensation phase angle is much faster than the increase of the rotational angle of the rotor. In other words the compensation phase angle can be a multiple of the rotor angle. For example, if there are 88 pole pairs, one rotation of the rotor, i.e. 360° rotor angle correspond to 88×360°=31680° of the compensation phase angle. Accordingly, the compensation phase angle could rise, according to this given example, for one revolution of the rotor from 0° to 31680°.

However, as explained further below, there is a relationship between the fundamental signal and the fraction harmonic signal. The fractional harmonic signal may have, for the above example, 24 sine-waves (or cycles) for 11 sine-waves (or cycles) of the fundamental signal. That means, with respect to the fundamental signal, the fractional harmonic signal repeats after 11 sine-waves (or cycles) of the fundamental signal. Simply speaking, a common zero-crossing of the fundamental signal and the fractional harmonic signal with the same slope (e.g. rising slope) repeats after 11 sine-waves (cycles) of the fundamental signal. For the given example, there are eight of such repetitions per single rotation of the rotor.

Nevertheless, the suggested counting of the 0° to 31680° is still found to be advantageous as there is only one absolute rotational position of the rotor, i.e. only one absolute rotational position per single revolution of the rotor.

Of course, instead of letting the compensation phase angle raise up to a value being a multiple of 360°, it could also be possible to start a new cycle of 0-360° each time the compensation phase angle has reached 360°. However, in that case a new relationship must be defined for such new cycle of 0-360°.

According to one aspect the fractional harmonic phase angle is determined depending on the absolute rotational position of the rotor and the compensation current, in particular the compensation phase angle is controlled depending on the fractional harmonic phase angle. Accordingly, even though it is not necessary it is nevertheless one option to frequently calculate or estimate the fractional harmonic current component, at least to measure or estimate the fractional harmonic phase angle. This could be done by an observer, in particular by means of a Kalman filter. Such Kalman filter could have the fractional harmonic current component modelled as a sinusoidal current or in general as a sinusoidal signal. The frequency of such sinusoidal signal can be calculated depending on the rotational frequency of the rotor and the number of pole pairs. Such observer can observe the fractional harmonic amplitude and the fractional harmonic phase angle based on that model. To do so, that observer can also measure the generator current and take the rotational speed and/or rotational position into account.

Based on such measured, estimated or calculated fractional harmonic current component the compensation current can be designed, in particular by a compensation amplitude and a compensation phase angle.

According to one aspect the compensation phase angle takes values from 0° up to a plurality of 360°, in particular from 0° up to a value of at least five times of 360°, in particular at least 11 times of 360°. Underlying this aspect is the idea already indicated above, to calculate the compensation current using a compensation phase angle which is going up to a value which is much higher than one single revolution, i.e. much higher than one period of a sine-function. This way the precise value of the compensation current signal can be calculated and thus given for each point in time. Using this compensation phase angle which takes such high values ensures to consider the exact phase angle for the compensation current not just close to the zero crossing of the first period of the fundamental signal of the generator current, but also to ensure an exact value for the compensation current signal at further/later periods of the fundamental signal.

Accordingly, the compensation current $i_C$ can be calculated using the formula:

$$i_C = I_0 * \sin(\varphi_C)$$

In this formula $i_C$ is thus the compensation current, $I_0$ the amplitude of the compensation current and $\varphi_C$ the compensation phase angle. Accordingly, the compensation current $i_C$ can simply be calculated and by using the compensation phase angle $\varphi_C$ going up to values much higher than 360°. That way a precise calculation is possible.

In addition or possibly for a different formula for calculating the compensation current $i_C$ the phase angle $\varphi_C$ of the compensation current can be calculated using the formula:

$$\varphi_C = (\varphi_R - \varphi_O) * n_P$$

The rotor angle is given by $\varphi_R$ and an offset phase angle is given by $\varphi_O$ and the number of pole pairs is given by $n_P$.

Accordingly, the compensation phase angle $\varphi_C$ clearly and directly depends on the rotor angle $\varphi_R$ and thus directly depends on the absolute rotational position of the rotor, as this absolute rotational position of the rotor can be reflected by the rotor angle $\varphi_R$.

According to this last formula the compensation phase angle $\varphi_C$ starts with the value zero when the rotor angle $\varphi_R$ reaches the offset phase angle $\varphi_O$. Starting from such rotor position the compensation phase angle $\varphi_C$ rises up to 360° $*n_P$.

After about one revolution of the rotor, i.e. just before $(\varphi_R - \varphi_O)$ reaches the value of 360°, the compensation phase angle $\varphi_C$ also reaches its maximum value, namely 360°$*n_P$.

Of course, a fractional harmonic phase angle can also be calculated in the same manner as the compensation phase angle $\varphi_C$. The same formula can be used whereas a different offset phase angle $\varphi_O$ should be used as the fractional harmonic current signal has the same frequency but a different phase angle than the compensation current, i.e. there is a phase shift between the fractional harmonic current signal and the compensation current. If the fractional harmonic current signal is calculated as a basis for calculating the compensation current, the compensation current must be calculated having said phase shift with respect to the fractional harmonic current signal.

According to one aspect the fractional harmonic phase angle or the compensation phase angle is determined depending on an estimated or measured value of the rotor position and depending on an estimated, measured or calculated electrical phase angle of the fundamental signal. It was found that the electrical phase angle of the fundamental signal cannot provide enough information for determining the fractional harmonic phase angle or the compensation phase angle, as the fractional harmonic current signal and thus the compensation current have a different phase relationship to the fundamental signal from one period of the fundamental signal to the next period of the fundamental signal. Accordingly, the electrical phase angle of the fundamental signal does not provide enough information.

On the other hand the rotor position and thus the absolute rotational position of the rotor provides such missing information, as it was found that the fractional harmonic current signal and accordingly the compensation current have a phase angle which can be defined with respect to the rotor position, i.e. the absolute rotational position of the rotor. However, it was also found that such rotor position might not be available with a high accuracy, whereas the electrical phase angle of the fundamental signal is often available with a high accuracy. The reason is that such electrical phase angle of the fundamental signal can be available in the inverter controlling the generator, as the inverter needs this electrical phase angle of the fundamental signal for controlling the stator current.

Accordingly, the idea of this aspect is to provide the absolute reference for the fractional harmonic phase angle or the compensation phase angle using the estimated or measured value of the rotor position, but based on that use the electrical phase angle of the fundamental signal. In other words the rotor position is used to identify or indicate a particular period of the fundamental signal of which the electrical phase angle can be used. When continuing the process the rotor will rotate towards a further period of the fundamental signal. This further period has a phase shift with respect to the fractional harmonic phase angle or the compensation phase angle when compared to the first harmonic of the fundamental signal. However, this phase shift is known and can be considered, i.e. calculated out. This way the absolute position is correct because of the use of the rotor position and it is precise because of the use of the electrical phase angle of the fundamental signal.

According to one aspect the fractional harmonic phase angle or the compensation phase angle is determined with respect to a phase angle of a reference period of the fundamental signal, wherein the fundamental signal having a plurality of periods (or cycles which can be used here as a synonym for periods) per revolution of the rotor or per segment of the rotor and the reference period is selected from the plurality of periods in dependence of the absolute rotational position of the rotor.

Accordingly, this way the fractional harmonic phase angle or the compensation phase angle can be determined depending on the rotational position and the fundamental signal and thus the advantages described above can be achieved. I.e. the absolute rotational position is used to identify a period of the fundamental signal and once this particular period is identified, i.e. selected as the reference period, the fractional harmonic phase angle or the compensation phase angle can be determined with respect to this period of the fundamental signal. In particular the zero crossing of the fundamental signal of this selected reference period can be taken as the reference point for defining the fractional harmonic phase angle or the compensation phase angle. With rotating rotor the next period of the fundamental signal will come up, but the selected reference period will still be the reference period for determining the fractional harmonic phase angle or the compensation phase angle.

According to the example given above, there could be 88 pole pairs and thus 88 fundamental periods (or sine-waves or cycles) per revolution and in case of eight segments 11 fundamental periods per segment of the rotor. Even though the fractional harmonic signal in that example thus repeats after 11 sine-waves (or cycles) of the fundamental signal, it is suggested to just pick one of the 88 fundamental periods as the reference period (or reference sine-wave or reference cycle, which could both be used as synonyms for reference period). Based on that the fractional harmonic phase angle or the compensation phase angle is determined with respect to a phase angle of a reference period of the fundamental signal counting the phase angle up until one complete revolution of the rotor, i.e. count up to 31680° in the given example.

However, it is also possible to define a new reference period for each segment and thus each time the fractional harmonic signal repeats, i.e. in that example repeats after 11 periods (or sine-waves or cycles) of the fundamental signal. In that case counting the phase angle up until one complete revolution of the rotor, i.e. count up to 31680° in the given example, is not necessary but counting up for 11 periods (or sine-waves or cycles) of the fundamental signal is enough, i.e. counting from 0° to 3960° is possible which corresponds to one segment and then start over. Accordingly counting eight times from 0° to 3960° in this example.

Accordingly, if not only one of the 88 periods is selected as the reference period and if according to this example the first period would be the selected reference period, the $12^{th}$ period is thus again the reference period, and the $23^{rd}$ period and so on as well. Accordingly, the zero crossing of this first and again the $12^{th}$ period and so on will each be the reference point for calculating the fractional harmonic phase angle.

According to one example which can also be used to illustrate the principle, the zero crossing of the fundamental signal of this first period, i.e. of the reference period, is identical to the zero crossing of the fractional harmonic current signal. This could be the start of calculating the fractional harmonic current signal and accordingly at this moment in time when the harmonic signal of the first period crosses zero, the fractional harmonic phase angle is also zero and that can be the starting for calculating the fractional harmonic phase angle for a complete revolution of the rotor.

The compensation phase angle can be calculated based on this fractional harmonic phase angle, but of course the compensation phase angle could also be calculated directly with respect to the reference point and thus according to one aspect with respect to the zero crossing of the selected reference period.

In particular it is suggested that in a starting step the fractional harmonic signal and/or the fractional harmonic phase angle is calculated depending on the absolute rotational position of the rotor and depending on the period of the fundamental signal having a zero crossing closest to a zero crossing of the fractional harmonic signal which was just calculated in the starting step. This period is selected as the reference period. Accordingly, the method could work such that in a starting step, the fractional harmonic signal is calculated for a full revolution of the rotor using the absolute rotational position of the rotor. This way the fractional harmonic signal and thus the fractional harmonic phase angle can be calculated, but with low accuracy.

However, such fractional harmonic signal or at least the fractional harmonic phase angle calculated in this manner can be compared with the fundamental signal of the generator current generated during this same revolution, or provided as a signal to be generated. Based on that the reference period and in particular the zero crossing of this reference period, in particular for the raising slope of the fundamental signal, can be selected and basically been taken for the further control of the generator.

Accordingly, only for the first revolution, for the start of the generator, the absolute rotational position is used to calculate the fractional harmonic current component in order to find or select the reference period. Once this reference period is found, the absolute rotational position is—simply speaking—not needed anymore until the next start of the generator. As the construction of the generator is known, the number of periods of the fundamental signal per revolution is also known, i.e. 88 according to the example given above, and thus no absolute rotational position of the rotor is needed anymore, unless the generator is started again.

In particular, the zero crossing of the fundamental signal of the reference period is used as a reference point and the fractional harmonic phase angle or the compensation phase angle is calculated with respect to such reference point. Using such zero crossing, in particular with a rising slope, is an easy way to identify the reference point. Often the calculation of such signals is based on a timeline and the reference point may thus be a point in time or at least be closely related to a point of time. The timeline can be used as a reference measure for calculating further parameters. In this respect the rising and falling slope are having a similar advantage. However, zero crossing of the rising slope corresponds to a sine-function for 0° and is thus maybe easier to handle.

Simply speaking by selecting the reference period, the reference point and thus the fractional harmonic signal is locked to the fundamental signal at this reference period. The fractional harmonic signal is having a phase shift from one period to the next, but at least after one revolution the fractional harmonic signal can be defined with respect to the fundamental signal again, i.e. to the fundamental signal of the reference period.

According to one aspect the compensation current $i_C$ is calculated using the formula:

$$i_C = I_0 * \sin(\varphi_a + \varphi_S)$$

with $I_0$ being the amplitude of the compensation current and $\varphi_a$ being the fractional harmonic phase angle and $\varphi_S$ being a phase shift angle defining a phase shift between the fractional harmonic current signal and the compensation current.

As explained above a compensation current could be calculated directly based on the reference point or it can be calculated based on the fractional harmonic current signal and thus based on the fractional harmonic phase angle. One advantage of using the fractional harmonic current and thus the fractional harmonic phase angle is that the fractional harmonic current and its phase angle may already be calculated and observed for documentation and/or other control purposes. Accordingly, the compensation current can just be calculated based on the fractional harmonic phase angle and as the compensation current should be shifted with respect to the fractional harmonic current, in order to compensate for it, the phase shift angle is used.

The phase shift angle can be identical to the offset phase angle explained further above, if the fractional harmonic phase angle at the starting is zero. In that case $\varphi_S = \varphi_O$.

The compensation current is thus defined using a sine-function. However, that is one way of putting this into practice but it is also for illustrative purposes. When in use it shall be considered that there is a compensation current for each phase, as there is also a fractional harmonic current component in each phase.

The compensation current shall be superimposed with the fundamental signal, i.e. with the main component of the generator current. The generator current, i.e. the stator current, is a three-phase current or in case of a six-phase current there are two three-phase currents. For controlling each of these three-phase currents the inverter and thus the controller controlling this inverter may use d/q-components in order to better control the generator current. Accordingly, it is suggested to also transform the compensation current into d/q-components.

The fractional harmonic phase angle used in the formula given above is dependent on the rotational position of the rotor. However, it may be calculated based on the fundamental signal if or once the fractional harmonic current signal or at least its phase angle is locked to the fundamental signal.

According to one aspect an inverter is used for controlling the stator current, the inverter is providing the compensation current and superimposing the compensation current with the stator current and the inverter receives at least one of:
  a mechanical rotational position,
  the amplitude of the compensation current and
  the phase shift angle or the offset phase angle.

The mechanical position is provided for calculating the fractional harmonic phase angle or calculating the compensation phase angle. It may be measured or estimated. However if an estimation is used, that may also involve a measurement.

In particular, it is suggested that the inverter receives all three measures. Accordingly, the inverter receives the mechanical rotational position, the amplitude of the compensation current and the phase shift angle, or the inverter receives the mechanical rotational position, the amplitude of the compensation current and the offset phase angle.

As explained above the phase shift angle describes the phase shift between the fractional harmonic signal and the compensation current. Accordingly, the fractional harmonic phase angle may be calculated based on the mechanical measured rotational position. Based on that the compensation current has a phase shift with respect to the fractional harmonic signal, i.e. the compensation phase angle has this phase shift angle with respect to the fractional harmonic phase angle. Thus, the particular phase angle of the compensation current can be calculated based on that. The amplitude of the compensation current is also important and thus can be set according to a corresponding value which the inverter receives. The inverter can receive such value of the amplitude of the compensation current once as a fixed value, more often with changing values or even continuously as a signal with a continuously changing value.

Based on that the inverter can calculate and thus provide the compensation current. Accordingly, one of the critical values is the mechanical rotational position that can be measured or it could also be estimated. However, an estimation may be difficult as most available input signals would be rather electrical and would thus be well designed for estimating the fundamental signal but it would be difficult to identify the particular period, i.e. the reference period. Accordingly, measuring at least one indication of the mechanical rotational position is preferred.

It is also possible to directly set the compensation current, i.e. without calculating and using a fractional harmonic signal, and in that case the compensation phase angle can be calculated based on the measured or estimated mechanical rotational position and also based on the offset phase angle. The offset phase angle describes the difference between a zero crossing of the fundamental signal of the reference period and the zero crossing of the compensation current to be set. Of course, in both cases the zero crossing refers to the same slope, i.e. both signals refer to the rising slope or both signals refer to the falling slope. Accordingly, the compensation phase angle can thus be calculated, also based on said offset phase angle and for determining the complete signal only the amplitude is needed as additional signal, as also explained above with respect to the particular formula defining the compensation current $i_C$. The frequency of the compensation current is assumed to be known as it is the same as the harmonic current component and there is a well-known relationship to the main frequency of the stator current.

According to one aspect in addition to controlling the compensation current for compensating the fractional harmonic current component at least one harmonic compensation current is controlled for compensating at least one harmonic current component each with a harmonic frequency having an integer multiple of the main frequency.

Accordingly, it was found that not only a fractional harmonic current component may exist but in addition a harmonic signal, i.e. a harmonic ripple may also be present and it is suggested to also cope for such harmonic by using a harmonic compensation current. The harmonic current, i.e. the harmonic ripple can be identified in particular using a Kalman filter having a model including functions of such higher harmonic signal, i.e. a signal having a frequency of a multiple of the base frequency of the fundamental signal.

This way both kinds of ripple can be counteracted.

According to one aspect a gearless permanent magnet excited synchronous generator is used, in particular a multi pole generator having a rotor with at least 40 pole pairs, in particular a ring shaped generator.

A synonymous name for the prominent magnet excited synchronous generator is a permanent excited synchronous generator or a permanent magnet synchronous generator. Accordingly, the rotor comprises permanent magnets as poles or pole pairs.

The synchronous generator is also a gearless type and that a gearless synchronous generator is used also means that the wind turbine is gearless with respect to the main generator. In other words the rotor of the synchronous generator is directly coupled, in particular fixed, to the aerodynamic rotor of the wind turbine. Accordingly, the aerodynamic rotor rotates with the same rotational speed as the rotor of the generator. Accordingly, the used synchronous generator is also a slowly rotating generator, as such aerodynamic rotor rotates with a maximum speed in the range of 5-20 revolutions per minute which is very slow compared to typical generators of a wind turbine with a gear system which have a typical rotational speed of about 1500 or 3000 revolutions per minute, depending on the type of generator.

Only such gearless generator is rotating that slow that a tonal noise with low frequency occurs. It was also found that such gearless permanent magnet excited synchronous generator has a relatively large size, in particular having a diameter at the air gap of at least 4 m and may go up to 10 m or even more. Such large generator thus also has a large surface which could emit noise. In particular, when connected to a casing of a nacelle a lot of noise can be emitted by such casing.

In particular, a multi pole generator having a rotor with at least 40 pole pairs, in particular a ring shaped generator is used. Such multi pole generator, which can also be called a ring generator having at least 40 pole pairs is accordingly a large generator having a large diameter and is thus capable of generating said tonal noise. It is therefore to be controlled in a special way which cannot be compared to a standard generator which is designed for 1500 or 3000 revolutions per minute.

According to one aspect the electrical phase angle is estimated using a sensorless method, in particular a sensorless control of the synchronous generator. A sensorless method is generally known in the art but it is here suggested for the particular issue of having a precise information on the fundamental signal of the generator current. Accordingly, the generator can be controlled without a sensor for permanently sensing the rotational speed and position of the rotor, even though a clear mechanical position of the rotor is important for the identification of the fractional harmonic current and/or for determining a corresponding compensation current. A sensor might be enough which just senses one particular position of the rotor which can be used to find the explained reference period and thus which can be used to lock the calculation of the fractional harmonic current component or the compensation current to the fundamental signal of the correct period, i.e. of the reference period.

According to the present disclosure there is also a wind turbine suggested. Such wind turbine has a generator with a rotor and a stator and the wind turbine is adapted being controlled such that the stator being controlled by means of a stator current, the stator current having a main component being characterized by a fundamental signal with a fundamental frequency and a fundamental phase angle and a fractional harmonic current component being characterized by a fractional harmonic signal having a fractional harmonic frequency and a fractional harmonic phase angle, the wind turbine is adapted to execute the steps providing a compensation current having a compensation amplitude and a compensation phase angle, and determining the compensation phase angle depending on an absolute rotational position of the rotor.

Thus, a wind turbine is suggested which has a generator in particular as explained above and may control the generator also as explained above in order to avoid or reduce low frequency noise in particular tonal noise of the generator.

According to one aspect the wind turbine has an inverter for controlling the stator current of the generator and a control unit for controlling the inverter and thus for controlling the generator. Accordingly, the inverter controls the stator current of the generator and this is done according to the control unit. In particular, the inverter comprises a DC intermediate circuit and a plurality of semiconductor switches for providing an alternating stator current based on the DC intermediate circuit. The inverter thus can also be understood or described as an actively controlled rectifier, as mainly the flow of energy is from the generator to the DC intermediate circuit.

The wind turbine is adapted to execute a method according to any of the explained aspects. This can mainly be done by its control unit. Accordingly, the method may be provided as a computer program and such computer program may be implemented in the control unit. In addition, the control unit may be interconnected with a sensor of the generator. It may also be connected to current and/or voltage sensors which may partly be part of the inverter.

Accordingly, the wind turbine having the generator may operate in a manner as explained with respect to the aspects of the explained method.

According to one aspect the wind turbine is a gearless wind turbine having the rotor of the generator directly coupled to an aerodynamic rotor of the wind turbine. Accordingly, the aerodynamic rotor of the wind turbine having a plurality of rotor blades rotates with the same rotational speed as the rotor of the generator. The purpose and advantage of such gearless wind turbine is explained above.

The present disclosure will now be described by way of example using embodiments and referring to the accompanying figures.

DETAILED DESCRIPTION

Figure 1:
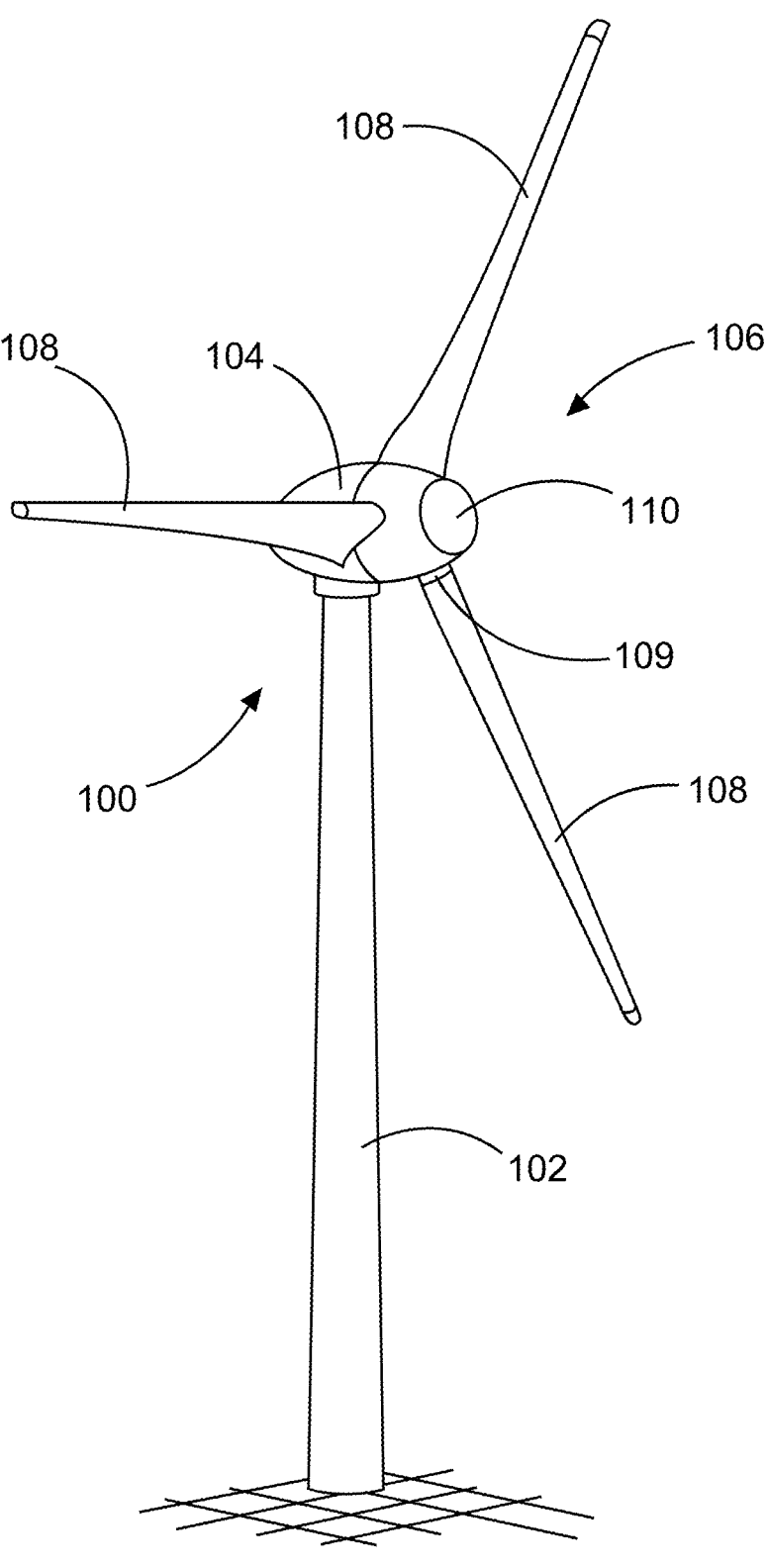
FIG. 1 shows a wind turbine in a perspective view.

FIG. 1 shows a schematic diagram of a wind turbine according to the disclosure. The wind turbine 100 includes a tower 102 and a nacelle 104 on the tower 102. An aerodynamic rotor 106 having three rotor blades 108 and a spinner 110 is provided on the nacelle 104. The aerodynamic rotor 106 is caused to rotate by the wind during operation of the wind turbine, and thus also rotates an electrodynamic rotor or rotor of a generator that is coupled to the aerodynamic rotor 106. The electrical generator is located in the nacelle 104 and generates electrical power. The pitch angle of the rotor blades 108 can be varied by pitch motors at the rotor blade roots 109 of the respective rotor blades 108.

Figure 2:
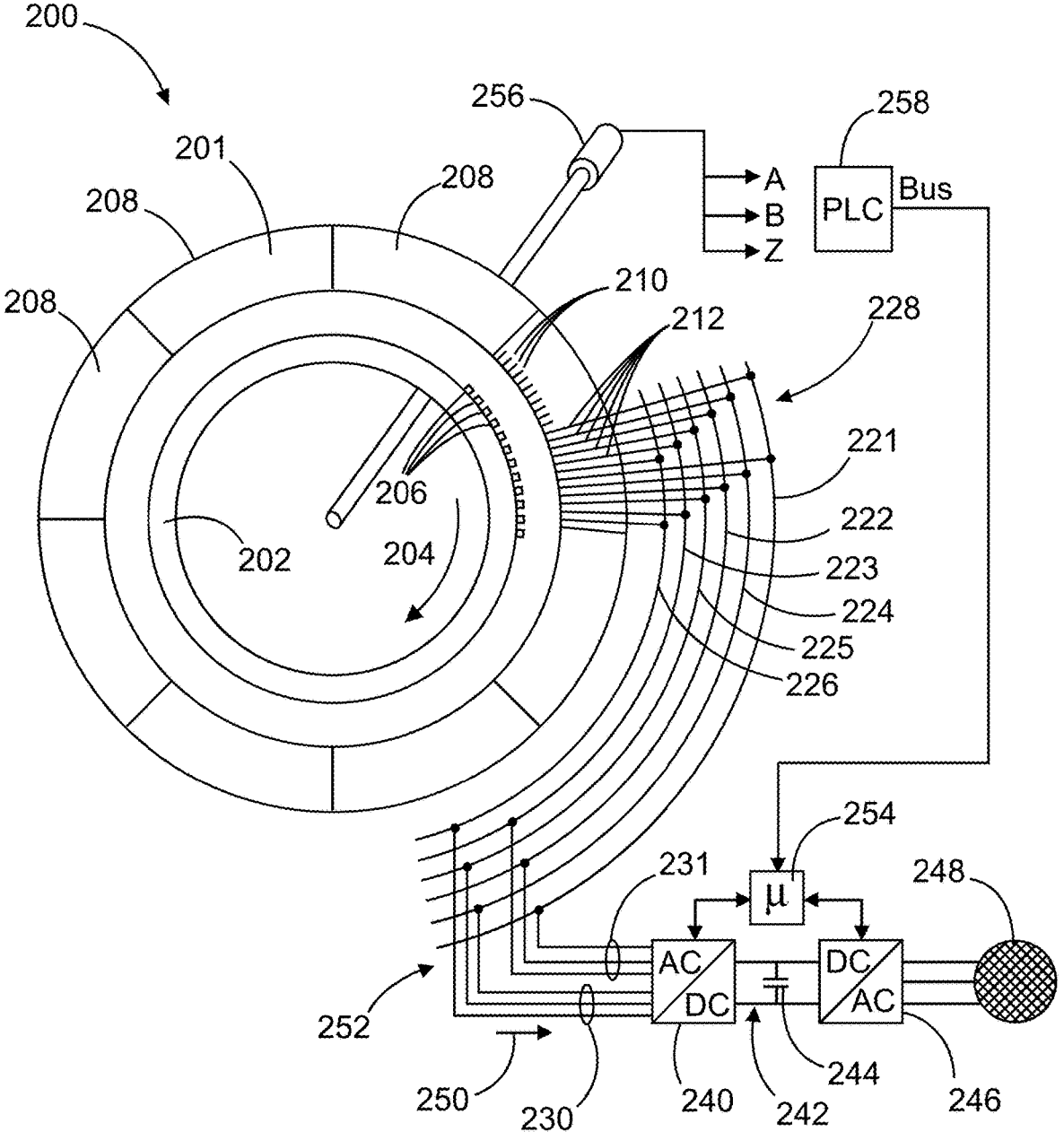
FIG. 2 shows a schematic illustration of a generator and its electrical connection.

FIG. 2 shows a generator 200 in a schematic view comprising some electrical connections and a mechanical sensor. The generator 200 has a stator 201 and a rotor 202. The rotor 202 when in operation rotates in a rotational direction 204. The rotor 202 may be constructed as a ring, and the stator 201 is also constructed similar to a ring. Accordingly, the generator 200 can be called a ring generator.

The shown generator 200 is a permanent magnet generator and accordingly the rotor 202 comprises a plurality of permanent magnets 206 only a few are shown and in the example that may be underlying the generator 200 in FIG. 2 there might be 11 pole pairs per segment, i.e. 22 magnets per segment, and for illustrative reasons only 11 magnets are illustrated, i.e. only every second magnet is drawn, and in the shown example the generator is subdivided in eight segments 208 illustrated at the stator 201. Accordingly, there may be 88 pole pairs. Only a few are illustrated in FIG. 2.

The stator 201 has a plurality of teeth 210, each tooth carrying a stator winding 212, just briefly indicated. Such stator windings 212 might be interconnected with others and the indicated direct connection from one stator winding to a phase wire is just a simplified illustration. According to one example which could be underlying the presently illustrated generator 200 in FIG. 2 there might be 24 teeth per segment and thus 192 teeth in total.

However, this is just for illustrative reasons and there could be more or less teeth, more or less segments and also more or less pole pairs.

However, the example shown in FIG. 2 shows a generator 200 having two three-phase systems 231 and 232.

Accordingly, there are thus six phases and for each phase there is a phase wire 221-226. In a repeating manner each stator winding 212 is connected to one of the six phase wires 221-226 illustrated in the connection area 228.

Of course, such connection area 228 is provided completely around the generator as only for illustrative purposes only some permanent magnets 206 are shown, and in that segment also only every second magnet is drawn, only some teeth 210 are shown and only some stator windings 212 are shown.

However, in a complete generator all stator windings provided around the generator are connected to one of the six phase wires 221-226 and thus these six phase wires 221-226 collect the stator current generated by the generator. Thus, the six phase wires 221-226 provide these two three-phase systems 231 and 232 which are connected to a generator side inverter 240. The generator side inverter 240 is connected to a DC link 242 having a DC intermediate circuit capacitor 244. A synonymous term for the DC link is a DC intermediate circuit. The DC link 242 is also connected to a grid side inverter 246 which is connected to the grid 248 in order to feed into the grid. The connection towards the grid is just briefly illustrated and any transformers, chokes or circuit breaker are not shown.

For controlling the generator the generator side inverter 240 is controlling the stator current 250 which is just briefly illustrated by an arrow but of course the stator current 250 is present in both three-phase systems 231 and 232 and thus present in all six phase wires 221-226.

However, it is also possible that not all stator windings are connected in parallel as shown in FIG. 2. It is possible that there is a series connection at least for parts of the wiring.

The phase wires 221-226 are connected to a generator terminal 252 which could be understood as an electrical output of the generator with respect to the stator current. The phase wires 221-226 do not at any point carry the whole stator current, as part of the current branches off at each connection area 228. Simply speaking the whole stator current 250 is only present as the complete stator current outside the illustrated generator terminal 252.

The generator side inverter is controlled by a control unit 254 which is also controlling the grid side inverter 246. However, that is explained just for the sake of completeness. For controlling the generator side inverter 240 the control unit 254 interacts with the generator side inverter and also receives at least one position signal from a rotor sensor 256. The rotor sensor 256 may provide a plurality of signals A, B and Z. These signals may be A for rotational position, B for rotational speed and Z for a zero indicator indicating an absolute position of the rotor 202. Such absolute position Z could for example indicate when a particular part of the rotor is at a reference position, e.g. at the bottom of the generator. All these signals given by the rotor sensor 256 can further be computed and prepared for transmittal in the programmable logic controller 258. Thus, the programmable logic controller 258 sends a signal comprising an information of the absolute rotational position to the control unit 254. Based on that a fractional harmonic current component can be calculated and used to control the generator side inverter in order to provide and superimpose a compensation current.

The programmable logic controller 258 may also send the other signals received from the rotor sensor 256 in order to use that for the remaining control of the generator, i.e. for controlling the fundamental current component of the generator current. However, it is also possible to use a sensorless control such that controlling the generator current does not need such signals on the position and/or rotational speed of the rotor. In that case a simplified sensor can be used instead of the shown and illustrated rotor sensor 256.

However, based on the example and also based on the number of pole pairs, teeth and segments of the example, the occurrence and nature of a fractional harmonic current can be explained. In the above illustrated example there are 11 pole pairs per segment and 24 teeth per segment, each carrying a stator winding. For such example there might result a fractional harmonic current component having a frequency of about 2.1818 times of the fundamental frequency. This factor results from the relation of numbers of teeth per segment to the number of pole pairs for a segment. I.e. 2.1818=24/11.

Of course this example explained above is just an illustrative example and other numbers of pole pairs, teeth and segments can occur in such generator.

Figure 3:
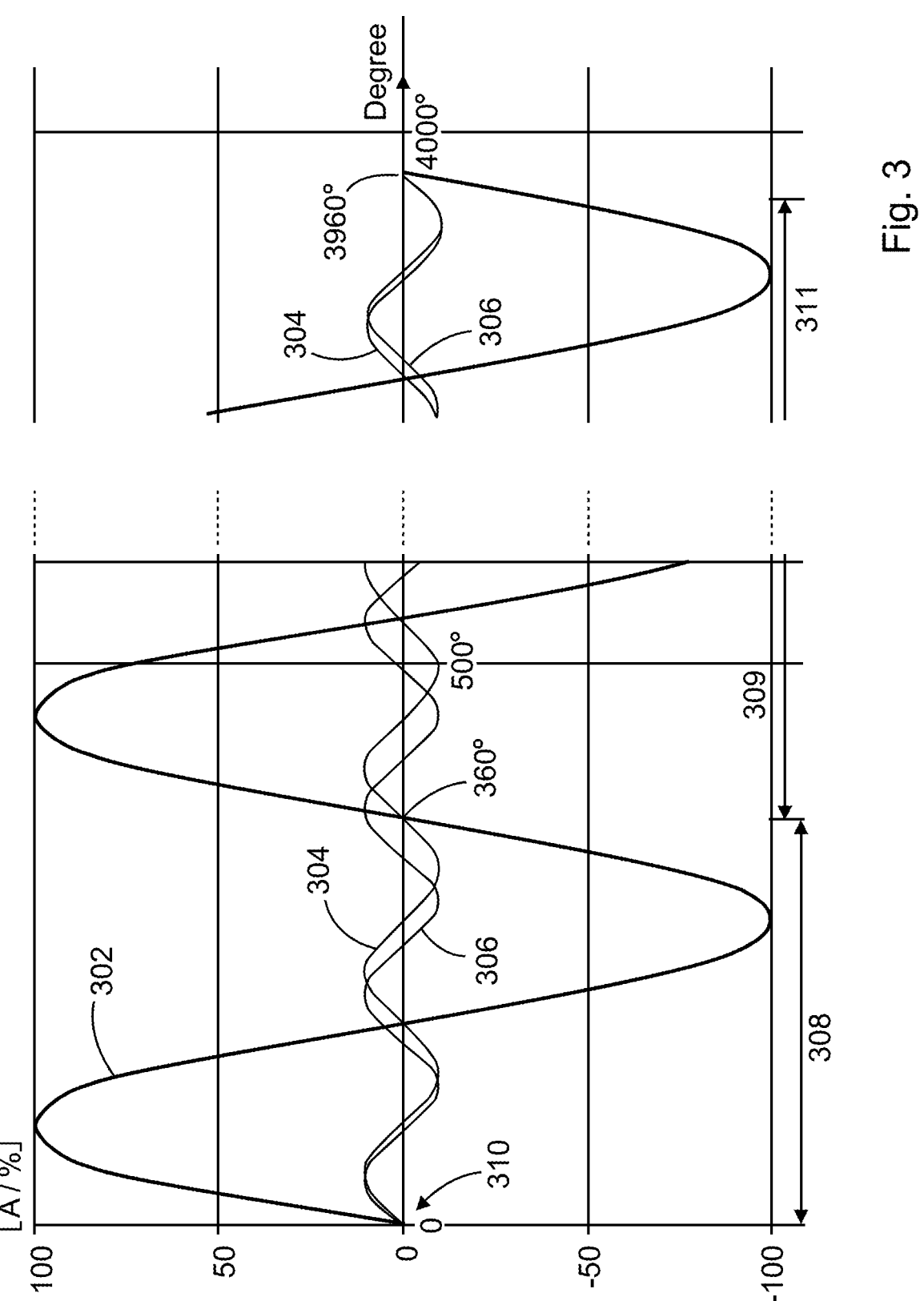
FIG. 3 shows a diagram of a fundamental signal, a fractional harmonic signal and a higher harmonic signal for illustrative purposes.

FIG. 3 shows a diagram showing of a generator current a fundamental signal 302, a second harmonic signal 304 and a fractional harmonic signal 306. The illustration corresponds to the example shown in FIG. 2. At the ordinate the amplitude is given in % referring to the amplitude of the fundamental signal 302 being 100%. At the abscissa degrees of the electrical system are shown having the fundamental signal as reference. Accordingly, one period 308 corresponds to 360°. However, for the next period the number of degrees is continued to count up. The illustration finally ends at 3960° which corresponds to 11 periods 308 of the fundamental signal 308. For illustrative reasons only the first period 308 is completely shown and only the end of the 11th

period is shown. The three dots in the interrupted abscissa indicate that there are the remaining periods of the fundamental signal.

As can be seen the second harmonic signal 304 has exactly the double-frequency of the fundamental signal 302. Accordingly, the relationship between the second harmonic signal 304 to the fundamental signal 302 is always the same for each period 308. In the illustrative diagram of FIG. 3 the second harmonic signal 304 is always having the same zero crossing at the beginning of the period as the fundamental signal 302. However, the second harmonic signal 304 could of course also be shifted with respect to that so that the second harmonic signal 304 does not need to have the same zero crossing as the fundamental signal 302.

Regarding the fractional harmonic signal 306 it is also illustrated as having the same zero crossing 310 as the fundamental signal 302. This is also for illustrative reasons and there could also be a shift between the zero crossing of the fractional harmonic signal and the fundamental signal. However, different to the second harmonic signal 304 the fractional harmonic signal 306 has a different start in the second period 309. Accordingly, for calculating the fractional harmonic signal 306 from the fundamental signal 302 it is important to identify the adequate period. In the shown illustration the first period 308 can be understood as the selected reference period or the first period 308 should be selected as the reference period. Such selection can be done based on an information of the rotational position of the rotor.

As explained the example of FIG. 3 corresponds to the example given for FIG. 2 and thus the fractional harmonic signal 306 reaches the zero crossing of the fundamental signal 302 again at the end of the $11^{th}$ period 311, i.e. at the beginning of the $12^{th}$ period, which is not shown. Accordingly, it is important to select the correct reference period out of the 11 periods after which the fractional harmonic signal matches again a reference point of the fundamental signal 302. In order to do that, said information of the absolute rotational positon is used.

Once the correct period has been selected, i.e. identified as the reference period, the information of the rotational position in the sense of receiving this from a sensor is not needed any further, but is again needed once the generator starts again. As can be seen the whole situation repeats always after 11 periods and thus the fractional harmonic signal 306 can be locked to the fundamental signal 302 once said identification of the correct period has been done and because of this locking of the fractional harmonic signal 306 to the fundamental signal 302 there is always the correct calculation of the fractional harmonic phase angle possible.

However, the shown 11 periods are part of 88 periods of one revolution of the generator as there are eight segments. Instead of selecting a reference period per segment, i.e. from 11 periods, just one reference period can be selected out of the 88 periods.

What is claimed is:

1. A method for controlling an electrical generator of a wind turbine, the electrical generator having a rotor and a stator, the stator being controlled by a stator current, the stator current having a main component having a fundamental signal with a fundamental frequency and a fundamental phase angle and a fractional harmonic current component having a fractional harmonic signal having a fractional harmonic frequency and a fractional harmonic phase angle, the method comprising:

providing a compensation current having a compensation amplitude and a compensation phase angle, and determining the compensation phase angle depending on an absolute rotational position of the rotor, wherein the fractional harmonic phase angle or the compensation phase angle is determined with respect to a phase angle of a reference period of the fundamental signal, the fundamental signal has a plurality of periods per revolution of the rotor or per segment of the rotor, the reference period is selected from the plurality of periods depending on the absolute rotational position of the rotor, in a starting step, at least one of the fractional harmonic signal or the fractional harmonic phase angle is determined based on the absolute rotational position of the rotor, a corresponding period of the fundamental signal having a zero crossing closest to a zero crossing of the fractional harmonic signal determined in the starting step is selected as the reference period, and the zero crossing of the fundamental signal of the reference period is used as a reference point and the fractional harmonic phase angle or the compensation phase angle is determined with respect to the reference point.

2. The method as claimed in claim 1, wherein the fractional harmonic phase angle is determined depending on the absolute rotational position of the rotor, and the compensation phase angle is controlled based on the fractional harmonic phase angle.

3. The method as claimed in claim 1, wherein the compensation phase angle ranges from 0° up to a plurality of 360°, wherein a compensation current $i_C$ is determined based on:

$$i_C = I_0 * \sin(\varphi_C),$$

wherein $I_0$ is the compensation amplitude of the compensation current, and $\varphi_C$ is the compensation phase angle, and the compensation phase angle qc is determined based on:

$$\varphi_C = (\varphi_R - \varphi_O) * n_P,$$

wherein $\varphi_R$ a rotor angle, $\varphi_O$ is an offset phase angle, and $n_P$ a number of pole pairs.

4. The method as claimed in claim 1, wherein the fractional harmonic phase angle or the compensation phase angle is determined based on a value of a rotor position and an electrical phase angle of the fundamental signal.

5. The method as claimed in claim 1, wherein a compensation current $i_C$ is determined based on:

$$i_C = I_0 * \sin(\varphi_a + \varphi_S),$$

wherein $I_0$ is the amplitude of the compensation current $\varphi_a$ is the fractional harmonic phase angle, and $\varphi_S$ is a phase shift angle defining a shift between the fractional harmonic current signal and the compensation current.

6. The method as claimed in claim 5, wherein
an inverter is used for controlling the stator current,
the inverter is providing the compensation current and superimposing the compensation current with the stator current, and
the inverter receives at least one of:
a mechanical rotational position,
the amplitude of the compensation current, and
the phase shift angle or an offset phase angle.

7. The method as claimed claim 1, wherein in addition to controlling the compensation current for compensating the fractional harmonic current component, at least one harmonic compensation current is controlled for compensating at least one harmonic current component each with a harmonic frequency having an integer multiple of the main frequency.

8. The method as claimed in claim 1, wherein
a gearless permanent magnet excited synchronous generator is used, wherein the gearless permanent magnet excited synchronous generator is a multi pole ring shaped generator having a rotor with at least 40 pole pairs.

9. The method as claimed in claim 1, wherein the electrical phase angle is estimated using a sensorless method.

10. A wind turbine comprising a generator including a rotor and a stator, wherein the wind turbine is configured to be controlled such that the stator is controlled by a stator current, wherein the stator current has a main component having a fundamental signal with a fundamental frequency and a fundamental phase angle, and a fractional harmonic current component having a fractional harmonic signal having a fractional harmonic frequency and a fractional harmonic phase angle, the wind turbine being configured to:

provide a compensation current having a compensation amplitude and a compensation phase angle, and
determine the compensation phase angle depending on an absolute rotational position of the rotor, wherein
the fractional harmonic phase angle or the compensation phase angle is determined with respect to a phase angle of a reference period of the fundamental signal,
the fundamental signal has a plurality of periods per revolution of the rotor or per segment of the rotor,
the reference period is selected from the plurality of periods depending on the absolute rotational position of the rotor,
in a starting step, at least one of the fractional harmonic signal or the fractional harmonic phase angle is determined based on the absolute rotational position of the rotor,
a corresponding period of the fundamental signal having a zero crossing closest to a zero crossing of the fractional harmonic signal determined in the starting step is selected as the reference period, and
the zero crossing of the fundamental signal of the reference period is used as a reference point and the fractional harmonic phase angle or the compensation phase angle is determined with respect to the reference point.

11. The wind turbine according to claim 10, wherein the wind turbine comprises:
an inverter configured to control the stator current of the generator, and
a controller configured to control the inverter for controlling the generator.

12. The wind turbine according to claim 10, wherein the wind turbine is a gearless wind turbine having the rotor of the generator being directly coupled to an aerodynamic rotor of the wind turbine.

* * * * *